United States Patent [19]

Ikeda et al.

[11] 4,265,667
[45] May 5, 1981

[54] STEP-TYPE LIGHT-TRANSMITTING BODY HAVING EXCELLENT WATER RESISTANCE

[75] Inventors: Yoshirou Ikeda; Yoshikazu Kaite, both of Nishinomiya, Japan

[73] Assignee: Nippon Sheet Glass Co., Ltd., Osaka, Japan

[21] Appl. No.: 145,455

[22] Filed: Apr. 25, 1980

[51] Int. Cl.³ .......................... C03C 3/08; C03C 3/10; C03C 13/00; G02B 5/14
[52] U.S. Cl. .................... 106/47 Q; 106/50; 106/54; 350/96.34
[58] Field of Search ................... 106/50, 54, 52, 47 Q; 350/96.34

[56] References Cited

U.S. PATENT DOCUMENTS

| | | | |
|---|---|---|---|
| 4,094,689 | 6/1978 | Van Ass et al. | 106/47 Q |
| 4,179,300 | 12/1979 | Sagara | 106/47 Q |

FOREIGN PATENT DOCUMENTS 32-4126 of 1957 Japan .
1108509 4/1968 United Kingdom .................. 350/96.34

*Primary Examiner*—Helen M. McCarthy
*Attorney, Agent, or Firm*—Wenderoth, Lind & Ponack

[57] ABSTRACT

A step-type light-transmitting body having excellent water resistance, said light-transmitting body comprising a core material of a glass having the following composition in % by weight: (1) $SiO_2$ 15–40, (2) $ZrO_2$ 8–17, (3) $B_2O_3$ 5–15, (4) BaO 30–45, (5) $Na_2O$ 3–15, as essential ingredients, and (6) $GeO_2$ 0–30, $TiO_2$ 0–3, $Al_2O_3$ 0–5, $La_2O_3$ 0–5, MgO 0–5, CaO 0–7, ZnO 0–7, SrO 0–5, $Li_2O$ 0–8, $K_2O$ 0–10, $Rb_2O$ 0–5, and $Cs_2O$ 0–8, as additional ingredients; provided that $SiO_2+GeO_2$ 15–50, $ZrO_2+BaO$ 38–55, $Na_2O+Li_2O+K_2O+Rb_2O+Cs_2O$ 5–15, and $MgO+CaO+ZnO+SrO+TiO_2+Al_2O_3+La_2O_3$ 0–12. In the above composition, the amounts of (2) $ZrO_2$, (3) $B_2O_3$, (5) $Na_2O$ and $ZrO_2+BaO$ may be changed to 8–15, 7–12, 5–12, and 38–50, respectively.

1 Claim, No Drawings

STEP-TYPE LIGHT-TRANSMITTING BODY HAVING EXCELLENT WATER RESISTANCE

This invention relates to a step-type light-transmitting body having excellent water resistance, and more specifically to a light-transmitting body having a large numerical aperture and a low loss and including a core glass having superior water resistance.

Generally, a light-transmitting glass fiber is composed of a core glass and a covering glass having a slightly lower refractive index than the core glass. A light-transmitting body in which the refractive index of the core glass is uniform along its sectional radial direction is called a step-type light-transmitting body. Such a step-type glass fiber transmits an optical information which has fallen upon one end of the core glass to the other end while almost wholly reflecting it in the boundary surface between the core glass and the covering glass.

Since an optical communication system using such a step-type glass fiber as a light-transmitting path has superior properties such as light weight, no induction, no crosstalk, low loss and large capacity, it has been rapidly exploited in recent years and come into commercial acceptance.

With this advance in the optical communication technology, the optical properties, chemical properties and mechanical properties which the glass fibers for use in such an application should possess have been gradually clarified.

One very important property required of glass fibers for light transmission paths is excellent water resistance, especially in an atmosphere kept at a high temperature and a high humidity, because the light-transmitting paths are placed under a natural environment. Water resistance is especially required in a covering glass of glass fibers used as light-transmitting paths. The core glass should also have superior water resistance because a joint portion, especially a joint end, should be provided in the light-transmitting paths for input or transmission of a light information and the core glass directly contacts the outer atmosphere at such a site.

Glass for the production of such optical glass fibers should have superior water resistance, superior optical properties and a markedly reduced tendency to the precipitation of crystals at high drawing temperatures during a spinning operation.

Important optical properties required of these optical glass fibers are low light transmission loss, high transparency and uniform refractive index.

In particular, the core glass of step-type glass fibers is required to have a low loss because most of the transmitted light propagates in the core glass.

Step-type glass fibers also need to have a large numerical aperture (NA) so as to permit light beams from a light source to fall upon the light-transmitting body with high efficiency.

Let the refractive index of the core glass be $n_1$ and the refractive index of the covering glass be $n_2$, then the numerical aperture (NA) is given by the following equation.

$$NA = \sqrt{n_1^2 - n_2^2}$$

Thus, the numerical aperture is larger as the difference between the refractive indices of the core glass and the covering glass is larger. Generally, a covering glass of a multicomponent composition having practical water resistance and the freedom from crystallization during a drawing operation usually has a refractive index of 1.51 to 1.52. Thus, to increase the numerical aperture, it is necessary to maximize the refractive index of the core glass.

Numerous multicomponent glasses have been suggested in the past for use as light-transmitting paths. These prior multicomponent glass compositions may be classified roughly as follows:

(1) Multicomponent glasses containing $SiO_2$, $Na_2O$ and CaO as main ingredients.

(2) Multicomponent glasses containing $SiO_2$, $Na_2O$ and PbO as main ingredients.

(3) Multicomponent glasses containing $SiO_2$, $GeO_2$ and $R_2O$ ($R_2O$ represents an alkali metal oxide such as $Na_2O$ or $K_2O$).

(4) Multicomponent glasses containing $SiO_2$, $Na_2O$ and $B_2O_3$ as main ingredients.

Core glasses or covering glasses of glass fibers for use as light-transmitting paths are currently produced by properly varying the constituent proportions of these multicomponent glasses.

Core glasses and covering glasses produced from the multicomponent glasses (1) to (3) above generally have the following defects.

Glass fibers produced from the multicomponent glasses (1) have poor water resistance. Furthermore, to improve the water resistance of these multicomponent glasses, $Al_2O_3$, MgO, etc. must be introduced as is well known in the sheet glass industry. Introduction of these ingredients, however, results in an abrupt rise in the glass melting temperature and the temperature suitable for operation, and glass fibers for light-transmitting paths having a low loss are difficult to produce from these glasses.

Glass fibers produced from the multicomponent glasses (2) above have poor water resistance when their PbO content is low. If the PbO content is increased to several tens of percent, the water resistance of the resulting glasses is improved, but with an increase in the PbO content, the loss of light due to scattering increases greatly. Thus, glass fibers of low loss for light-transmitting paths are difficult to produce.

Glass fibers produced from the multicomponent glasses (3) above induce a large loss of light due to scattering because these glasses have a great tendency to crystallization. As a result, glass fibers of low loss for light-transmitting paths are difficult to produce.

The multicomponent glasses (4), on the other hand, generally have the advantage that the glass melting temperature is as low as less than 1300° C., and the light absorption loss due to iron metal as an impurity is low. One of the co-inventors of the present application investigated the glass composition (4), and disclosed in Japanese Patent Publication No. 29524/76 a glass composition range suitable for the production of converged-type (ie. focusing-type) glass fibers.

Subsequent to the aforesaid prior art, Japanese Laid-Open Patent Publication No. 3352/78 suggested a multi-component glass of the $SiO_2$-$Na_2O$-$B_2O_3$ type. This Publication suggests step-type glass fibers for optical communication in which the core component consists of a multicomponent glass composed of 45 to 65% by weight of $SiO_2$, 1 to 5% by weight of $Al_2O_3$, 17 to 23% by weight of alkali metal oxides comprising mainly Na₂O, 5 to 12% by weight of CaO, 4 to 15% by weight of $B_2O_3$ and 1 to 12% by weight of $ZrO_2$.

Japanese Laid-Open Patent Publication No. 3354/78 suggests step-type glass fibers for optical communication in which the core component is a multicomponent glass composed of 55 to 65% by weight of $SiO_2$, 1 to 5% by weight of $Al_2O_3$, 14 to 21% by weight of alkali metal oxides, 1 to 7% by weight of CaO and 11 to 20% by weight of SrO+BaO, or a multicomponent glass composed of the aforesaid multicomponent glass and 2 to 8% by weight of $ZrO_2$ and 2 to 8% by weight of $B_2O_3$.

Japanese Laid-Open Patent Publication No. 60240/78 discloses step-type glass fibers for optical communication in which the core component is a multicomponent glass composed of 35 to 55% by weight of $SiO_2$, 13 to 21% by weight of alkali metal oxides and 27 to 52% by weight of CaO+BaO+ZnO.

Investigations of the present inventors have shown that multicomponent glasses of the above-cited compositions, when used as a core component of light-transmitting glass fibers, have water resistance which is still to be improved and a refractive index of about 1.600 at the highest, and that for use in producing light-transmitting glass fibers having a covering component of a usual multicomponent glass with a refractive index of 1.51 to 1.52, it is desirable to increase their refractive indices further from the standpoint of numerical aperture.

Japanese Patent Publication No. 4126/57 discloses a glass composed of 35 to 52% by weight of $SiO_2$, 6 to 12% by weight of alkali metal oxides, 28 to 34% by weight of barium oxide, 2 to 15% by weight of $ZrO_2$ and 5 to 15% by weight of an oxide selected from the group consisting of CaO, ZnO, PbO, CdO and SrO (the proportion of each of these oxides does not exceed 10% by weight), which is suitable as a small lens portion of a multifocal ophthalmic lens. In this Patent Publication, the above glass may further contain a small amount of $B_2O_3$, but it is stated there that when the amount of $B_2O_3$ exceeds 1% by weight, it is difficult to obtain a glass having a high softening point and other desirable properties. This Patent Publication is quite silent on a light-transmitting body composed of a glass having good water resistance and capable of being easily drawn.

It is an object of this invention therefore to provide a multicomponent glass having improved water resistance which is suitable for use as a core component of step-type glass fibers for light transmission.

Another object of this invention is to provide a multicomponent glass which is suitable for use as a core component capable of being easily drawn in the production of step-type glass fibers for light transmission.

Still another object of this invention is to provide a multicomponent glass having a high refractive index which is suitable for use as a core component of a step-type light transmitting body.

A further object of this invention is to provide a step-type light-transmitting body using as a core component a multicomponent glass which has improved water resistance and a high refractive index and preferably is capable of being easily drawn.

Other objects and advantages of this invention will become apparent from the following description.

The objects and advantages of this invention are achieved in accordance with this invention by a step-type light-transmitting body having excellent water resistance wherein the core component is a glass having the following composition in % by weight:

| | | |
|---|---|---|
| (1) | $SiO_2$ | 15–40 |
| (2) | $ZrO_2$ | 8–17, |
| (3) | $B_2O_3$ | 5–15, |
| (4) | BaO | 30–45, |
| (5) | $Na_2O$ | 3–15, |
| (6) | $GeO_2$ | 0–30, |
| | $TiO_2$ | 0–3, |
| | $Al_2O_3$ | 0–5, |
| | $La_2O_3$ | 0–5, |
| | MgO | 0–5, |
| | CaO | 0–7, |
| | ZnO | 0–7, |
| | SrO | 0–5, |
| | $Li_2O$ | 0–8, |
| | $K_2O$ | 0–10, |
| | $Rb_2O$ | 0–5, and |
| | $Cs_2O$ | 0–8; |
| provided that | | |
| $Si_2O + GeO_2$ | | 15–50, |
| $ZrO_2 + BaO$ | | 38–55, |
| $Na_2O + Li_2O + K_2O +$ $Rb_2O + Cs_2O$ | | 5–15, and |
| $MgO + CaO + ZnO + SrO +$ $TiO_2 + Al_2O_3 + La_2O_3$ | | 0–12. |

The characteristic in composition of the multicomponent glass used as a core of the step-type light-transmitting body of this invention is that (I) it comprises as essential ingredients $SiO_2$, $ZrO_2$, $B_2O_3$, BaO and $Na_2O$, and (II) as additional components at least one of $GeO_2$, $TiO_2$, $Al_2O_3$, $La_2O_3$, MgO, CaO, ZnO, SrO, $Li_2O$, $K_2O$, $Rb_2O$ and $Cs_2O$.

The five essential ingredients are necessary for imparting various properties required of a core component of a light-transmitting body to the multicomponent glass. Particularly, the inclusion of $ZrO_2$ and BaO together contributes to the full exhibition of the various properties as will be described hereinbelow.

The multicomponent glass for the core component of the light-transmitting body of this invention may further include the aforesaid additional ingredients. These additional ingredients should not be taken as components that may simply be present, but as components which impart additional properties to the multicomponent glass composed of the aforesaid essential ingredients without impairing its excellent properties.

The multicomponent glass contains the essential components and the additional components in the specified proportions described above.

The multicomponent glass in accordance with this invention differs from the multicomponent glass disclosed in the above-cited Japanese Laid-Open Patent Publication No. 3352/78 in that it contains BaO, and also differs from the multicomponent glass disclosed in the above-cited Japanese Laid-Open Patent Publication No. 3354/78 in regard to the contents of $SiO_2$ and SrO+BaO.

The core glass in accordance with this invention also quite differs in the contents of BaO and $ZrO_2$ from the multicomponent glass disclosed in U.S. Ser. No. 81257 filed on Oct. 2, 1979 by the present applicants.

Owing to the different composition from the prior art glasses, the multicomponent glass in accordance with this invention exhibits different characteristics from the multicomponent glasses disclosed in the prior art, for example excellent water resistance, high refractive indices and the ease of drawing or spinning.

The individual components of the multicomponent glass in accordance with this invention are described below.

SiO$_2$

This ingredient is essential in imparting transparency and water resistance to the multicomponent glass.

The multicomponent glass in this invention contains 15 to 40% by weight of SiO$_2$. If the content of SiO$_2$ is less than 15% by weight, the water resistance of the glass is degraded. If it exceeds 40% by weight, the viscosity of the glass increases and its refractive index decreases, making it impossible to obtain a multicomponent glass which is suitable for production of a light-transmitting body having a large numerical aperture.

Preferably, the multicomponent glass contains SiO$_2$ in a proportion of 20 to 35% by weight.

B$_2$O$_3$

This ingredient serves to increase the water resistance of the glass and to prevent its crystallization. The multicomponent glass in accordance with this invention contains B$_2$O$_3$ in a proportion of 5 to 15% by weight. If the content of B$_2$O$_3$ is less than 5% by weight, the effect of inhibiting crystallization (to be referred to as devitrification) of the glass is reduced, and the viscosity of the glass increases. On the other hand, if it exceeds 15% by weight, the water resistance of the glass is reduced, and the devitrification of the glass increases.

Preferably, the multicomponent glass contains 7 to 12% by weight of B$_2$O$_3$.

Alkali metal oxides

The alkali metal oxides, as referred to in this invention, are Na$_2$O, Li$_2$O, K$_2$O, Rb$_2$O and Cs$_2$O. Na$_2$O is an essential constituent element in the multicomponent glass in accordance with this invention, and is contained in an amount of 3 to 15% by weight. The other alkali metal oxides, Li$_2$O, K$_2$O, Rb$_2$O and Cs$_2$O, may be used singly or as a mixture with each other in such a proportion that the total amount of these oxide and Na$_2$O is 5 to 15% by weight. For example, when the alkali metal oxides are included in a proportion of 5% by weight in the multicomponent glass in accordance with this invention, the alkali metal oxides may be comprised of 3% by weight of Na$_2$O and 2% by weight of at least one of the other alkali metal oxides.

Li$_2$O and Cs$_2$O may be included each in an amount of up to 8% by weight. K$_2$O may be included in an amount of up to 10% by weight, and Rb$_2$O, in an amount of up to 5% by weight.

If the content of the alkali metal oxides is less than 5% by weight, the viscosity of the glass is high and the devitrification tendency of the glass increases. On the other hand, when their content exceeds 15% by weight, the water resistance of the glass is degraded.

The water resistance of the glass is likewise degraded if the additional alkali metal oxides other than Na$_2$O are included in amounts exceeding the respective upper limits.

Preferably, the multicomponent glass in this invention contains 5 to 12% by weight of Na$_2$O and 5 to 15% by weight of the additional alkali metal oxides.

BaO

This ingredient increases the refractive index of the glass, and therefore gives a multicomponent glass for a light-transmitting body having a large numerical aperture.

The multicomponent glass in this invention contains BaO in a relatively large amount, i.e. in an amount of 30 to 45% by weight.

If the amount of BaO is less than 30% by weight, a glass having such a high refractive index as desired intended by the present invention cannot be obtained. If it exceeds 45% by weight, the devitrification of the glass increases and its water resistance is also degraded.

Preferably, the multicomponent glass in this invention contains 30 to 40% by weight of BaO.

ZrO$_2$

This ingredient increases the refractive index of the glass, and therefore gives a multicomponent glass for a light-transmitting body having a large numerical aperture.

ZrO$_2$ is characteristic in that when included together with BaO in the multi-component glass in this invention, it synergistically increases the refractive index of the multicomponent glass.

Investigations of the present inventors have shown that when three types of glass are produced by including ZrO$_2$, or BaO, or ZrO$_2$+BaO in a base composition SiO$_2$-B$_2$O$_3$-Na$_2$O, the multicomponent glass containing both ZrO$_2$ and BaO shows a far greater increase in refractive index than the total increase of the refractive indices of the multicomponent glasses containing ZrO$_2$ or BaO singly. It has also been found by the inventors that the action of ZrO$_2$ to increase refractive indices synergistically is exhibited not only in combination with BaO but also in combination with other oxides such as CaO, TiO$_2$, ZnO, GeO$_2$, SrO and La$_2$O$_3$.

Another feature of ZrO$_2$ is that it increases the refractive index of glass per unit weight percent of ZrO$_2$ to a larger extent than other oxides.

The multicomponent glass in this invention, therefore, has the advantage that the inclusion of ZrO$_2$ leads to the high refractive index of the glass without the need to incorporate large amounts of the other oxides, and consequently, the reduction of water resistance due to the other oxides can be minimized.

The multicomponent glass in this invention may contain 8 to 17% by weight of ZrO$_2$. If the content of ZrO$_2$ is less than 8% by weight, the effect of increasing the refractive index of the glass synergistically is small. If it exceeds 17% by weight, the devitrifying tendency of glass increases abruptly.

When the contents of ZrO$_2$ and BaO exceed the specified upper limits, the devitrifying tendency of the glass increases. The upper limit of the total amount of ZrO$_2$ and BaO is suitably 55% by weight, preferably 50% by weight.

Additional ingredients

Amont the additional ingredients, Li$_2$O, K$_2$O, Rb$_2$O and Cs$_2$O, have been described hereinabove.

The other additional ingredients used in this invention are GeO$_2$, TiO$_2$, Al$_2$O$_3$, La$_2$O$_3$, MgO, CaO, ZnO and SrO.

The multicomponent glass in this invention may contain 0 to 30% by weight of GeO$_2$, 0 to 3% by weight of TiO$_2$, 0 to 5% by weight of Al$_2$O$_3$, 0 to 5% by weight of La$_2$O$_3$, 0 to 5% by weight of MgO, 0 to 7% by weight of CaO, 0 to 7% by weight of ZnO and 0 to 5% by weight of SrO.

Except Al$_2$O$_3$, these components serve to increase the refractive index of the glass synergistically in combination with $ZrO_2$ or BaO. In particular, $TiO_2$, MgO, CaO and ZnO have a high degree of such a synergistic action, and are therefore, preferred in this invention.

Preferably, the aforesaid additional ingredients are used in an amount of at least 1% by weight. They are used such that the total amount of MgO, CaO, ZnO, SrO, $TiO_2$, $Al_2O_3$ and $La_2O_3$ is not more than 12% by weight, and $GeO_2$ is used such that the total amount of $GeO_2$ and $SiO_2$ is 15 to 50% by weight.

$GeO_2$, Like $SiO_2$ described hereinabove, acts as a network former in the multicomponent glass in this invention. Since, however, $GeO_2$ has a greater action of reducing the water resistance of glass than $SiO_2$, it is undesirable to incorporate too much $GeO_2$.

According to this invention, there is provided a step-type light-transmitting body comprising as a core component the multicomponent glass in accordance with this invention which has excellent water resistance, a high refractive index of, say, 1.60 to 1.66 and a low loss of light transmission.

Another characteristic feature of the multicomponent glass in accordance with this invention is that it can efficiently give a step-type light-transmitting body of uniform performance because it has a reduced tendency to devitrification and it is easy to match its viscosity and coefficient of linear expansion with those of a covering glass.

The step-type light-transmitting body comprising the multicomponent glass in accordance with this invention as a core component can be produced usually by methods known as a double or multiple crucible method and a pipe rod method (or also called a rod-in-tube method).

According to the double crucible method, the step-type light-transmitting body can be produced by maintaining a glass composition for a core component and a glass composition for a covering component in the molten state in an inside crucible and an outside crucible disposed concentrically, allowing molten glass compositions to flow down respectively from openings at the lower ends of the crucibles, and drawing the flowing glass melts together.

The pipe rod method comprises inserting a round rod composed of a glass composition for a core component into a pipe composed of a glass composition for a covering component, heating them and fusing them to each other, and stretching the assembly.

According to this invention, a multicomponent glass having a refractive index of 1.60 to 1.66 is provided. By using it in combination with an ordinary multicomponent glass used as a covering component for step-type light-transmitting bodies, a step-type light-transmitting body having a numerical aperture of as large as about 0.50 to 0.69 can be provided advantageously.

Because of its reduced tendency to devitrification and high refractive index, the multicomponent glass in this invention can be used as a core component of step-type light-transmitting bodies comprising various multicomponent glasses as a covering component.

Multicomponent glass compositions having equally excellent water resistance to the core component are preferably used as a cover component in the step-type light-transmitting body of this invention. Especially preferred multicomponent glass compositions for use as a covering component are those described in a prior patent application, German DOS No. 2940451 which will be published on Apr. 24, 1980. Accordingly, the specification of DOS No. 2940451 is cited hereby as reference.

The multicomponent glass as a covering component disclosed in the cited DOS comprises
(a) 38 to 70% by weight of $SiO_2$, 4 to 22% by weight of $B_2O_3$, 8 to 24% by weight of $Na_2O$, 1 to 22% by weight of $Al_2O_3$ and 1 to 16% by weight of ZnO as essential ingredients, and
(b) 1 to 15% by weight of $K_2O$, 0 to 15% by weight of $Li_2O$, 0 to 15% by weight of $Cs_2O$, 0 to 7% by weight of $TiO_2$, 0 to 7% by weight of $ZrO_2$, 0 to 7% by weight of CaO, 0 to 7% by weight of BaO, and 0 to 7% by weight of MgO as additional ingredients;

provided that the total amount of the alkali metal oxides is 13 to 24% by weight, and the total amount of $Al_2O_3$, ZnO, $TiO_2$, $ZrO_2$, CaO, BaO and MgO is 2 to 32% by weight.

Preferably, this multicomponent covering glass comprises
(a′) 46 to 70% by weight of $SiO_2$, 6 to 20% by weight of $B_2O_3$, 8 to 24% by weight of $Na_2O$, 1 to 15% by weight of $Al_2O_3$ and 1 to 16% by weight of ZnO, and
(b′) 0 to 15% by weight of $K_2O$, 0 to 15% by weight of $Li_2O$, 0 to 15% by weight of $Cs_2O$, 0 to 7% by weight of $TiO_2$, 0 to 5% by weight of $ZrO_2$, 0 to 7% by weight of CaO and 0 to 7% by weight of BaO;

provided that the total amount of the alkali metal oxides is 16 to 24% by weight, and the total amount of $Al_2O_3$, ZnO, $TiO_2$, $ZrO_2$, CaO and BaO is 2 to 20% by weight.

Or preferably, this covering glass comprises
(a″) 38 to 57% by weight of $SiO_2$, 4 to 22% by weight of $B_2O_3$, 8 to 24% by weight of $Na_2O$, 15 to 22% by weight of $Al_2O_3$ and 1 to 16% by weight of ZnO, and
(b″) 0 to 15% by weight of $K_2O$, 0 to 15% by weight of $Li_2O$, 0 to 15% by weight of $Cs_2O$, 0 to 7% by weight of $TiO_2$, 0 to 7% by weight of $ZrO_2$, 0 to 7% by weight of CaO, 0 to 7% by weight of BaO and 0 to 7% by weight of MgO;

provided that the total amount of the alkali metal oxides is 13 to 24% by weight, and the total amount of $Al_2O_3$, ZnO, $TiO_2$, $ZrO_2$, CaO, BaO and MgO is 16 to 32% by weight.

Preferably, the covering glass component for the production of the step-type light-transmitting body of this invention has a difference, in the temperature at which the viscosity of glass is $10^{3.5}$ poises, of not more than 190° C. from the core glass component, and a difference in the coefficient of linear expansion of not more than $14 \times 10^{-7}$ from the core glass component.

The following Examples and Comparative Examples illustrate the present invention more specifically. The various properties of glasses and light-transmitting bodies in these examples were determined by the following methods.

Water resistance of glass

A glass rod having a diameter of 2 to 3 mm was drawn up from a melt of a multicomponent glass specimen, and a silicone resin was coated on the surface of the resulting glass rod. The silicone-coated glass rod was then dipped in distilled water at 90° C., and taken out every 10 hours for inspection of its surface under an optical microscope. The lapse of time at which a precipitate causing a loss of gloss was observed on the surface of the glass rod was defined as a limit to the water resistance of the glass rod.

The water resistance so determined well represents the water resistance of a light-transmitting body coated with plastics such as a silicone resin in water. Investigations of the present inventors have shown that a multicomponent glass having a water resistance of more than 90 hours gives a light-transmitting body of very high utilitarian value.

Coefficient of linear expansion and refractive index

The coefficient of linear expansion was measured by using instruments generally known in the art. The refractive index was measured by using an Abbe's refractometer.

Viscosity

The viscosity of a glass specimen was measured at 800° to 1000° C. by a sedimentation method using a platinum ball, and the temperature-viscosity curve of the specimen was drawn. From this curve, the temperature at which the glass has a viscosity of $10^{3.5}$ poises was determined. This temperature represents a temperature suitable for spinning (drawing).

Devitrifying tendency

Above 50 g of glass mass was collected from glass produced by melting in an electric furnace. Its surface was washed and dried, and then the glass mass was placed on a platinum tray. Then, it was held in an electric furnace at 950° C. for 5 hours. The glass was then withdrawn from the electric furnace and allowed to cool to room temperature. The surface and inside of the glass mass were carefully observed for the presence or absence of crystals precipitated. When there was no precipitation of crystals, the sample was rated "good". It has been found in accordance with the presence invention that glasses which are rated "good" have superior utility without any trouble attributed to the precipitation of crystals.

Transmission loss of a light-transmitting body

The transmission losses at 830 nm and 630 nm were measured using a light-emitting diode.

EXAMPLES 1 TO 20 AND COMPARATIVE EXAMPLES 1 TO 4

Glasses having the compositions shown in Table 1 were produced. One thousand grams of each of the glasses was put into a platinum or quartz crucible and melted in an electric furnace at 1200° to 1350° C. for 2 to 4 hours. To reduce minute air bubbles in the glass, 0.3 to 0.69 g of arsenous acid or antimony trioxide was added per 100 g of glass. Such a minor proportion of arsenous acid or antimony trioxide does not exert any detectable effect on the properties of glass.

The properties of the molten glasses were measured by the methods described hereinabove, and the results are shown in Table 1.

For comparison, four known glass compositions and their properties are also shown in Table 1. In the Comparative Examples, the asterisks attached to the figures representing their compositions show that these figures are outside the composition specified in the present invention.

TABLE 1

| Composition | Example 1 | 2 | 3 | 4 | 5 | 6 | 7 | 8 |
|---|---|---|---|---|---|---|---|---|
| $SiO_2$ | 34 | 33 | 27 | 30 | 33 | 38 | 30 | 33 |
| $B_2O_3$ | 8 | 7 | 10 | 9 | 11 | 6 | 11 | 11 |
| $Li_2O$ | 7 | — | — | — | — | — | — | — |
| $Na_2O$ | 4 | 11 | 9 | 10 | 15 | 12 | 10 | 11 |
| $K_2O$ | — | — | — | — | — | — | — | — |
| $Rb_2O$ | — | — | — | — | — | — | — | — |
| $Cs_2O$ | — | — | — | — | — | — | — | — |
| MgO | — | — | — | — | — | 4 | — | — |
| CaO | — | — | — | 1 | — | — | — | — |
| SrO | — | — | — | — | — | — | — | 3 |
| $ZrO_2$ | 8 | 10 | 17 | 13 | 9 | 8 | 10 | 10 |
| BaO | 33 | 36 | 32 | 37 | 30 | 32 | 35 | 32 |
| ZnO | — | 3 | — | — | — | — | — | — |
| $TiO_2$ | — | — | — | — | 2 | — | — | — |
| $GeO_2$ | 5 | — | 5 | — | — | — | — | — |
| $La_2O_3$ | — | — | — | — | — | — | 4 | — |
| $Al_2O_3$ | 1 | — | — | — | — | — | — | — |
| Properties of glass | | | | | | | | |
| Water resistance (hr) | 180 | 190 | 250 | 210 | 190 | 180 | 190 | 200 |
| Temperature at which the viscosity is $10^{3.5}$ poises (°C.) | 881 | 902 | 964 | 916 | 900 | 918 | 897 | 886 |
| Devitrifying tendency | Good | Good | Good | Good | Good | Good | Good | Good |
| Refractive index | 1.618 | 1.634 | 1.653 | 1.645 | 1.618 | 1.613 | 1.639 | 1.628 |
| Coefficient of linear expansion ($\times 10^7$) | 93 | 95 | 98 | 94 | 95 | 105 | 96 | 96 |

| Composition | Example 9 | 10 | 11 | 12 | 13 | 14 | 15 | 16 |
|---|---|---|---|---|---|---|---|---|
| $SiO_2$ | 32 | 30 | 35 | 30 | 31 | 17 | 29 | 30 |
| $B_2O_3$ | 7 | 10 | 8 | 11 | 8 | 6 | 11 | 14 |
| $Li_2O$ | — | — | — | — | — | 3 | — | — |
| $Na_2O$ | 11 | 7 | 4 | 10 | 10 | 3 | 10 | 4 |
| $K_2O$ | — | 3 | — | — | — | — | — | — |
| $Rb_2O$ | — | — | — | — | — | — | — | — |
| $Cs_2O$ | — | — | 7 | — | — | — | — | 4 |
| MgO | — | — | — | — | — | — | — | 2 |
| CaO | — | 7 | — | 4 | — | — | 2 | 5 |
| SrO | — | — | — | 2 | — | — | — | — |
| $ZrO_2$ | 9 | 8 | 11 | 8 | 8 | 9 | 15 | 8 |

TABLE 1-continued

|  | | | | | | | | |
|---|---|---|---|---|---|---|---|---|
| BaO | 35 | 32 | 35 | 32 | 43 | 35 | 33 | 30 |
| ZnO | 6 | — | — | — | — | — | — | — |
| TiO$_2$ | — | 1 | — | — | — | — | — | — |
| GeO$_2$ | — | — | — | — | — | 27 | — | — |
| La$_2$O$_3$ | — | — | — | 3 | — | — | — | 2 |
| Al$_2$O$_3$ | — | 2 | — | — | — | — | — | 1 |
| Properties of glass | | | | | | | | |
| Water resistance (hr) | 200 | 190 | 190 | 180 | 160 | 180 | 230 | 180 |
| Temperature at which the viscosity is 10$^{3.5}$ poises (°C.) | 895 | 853 | 905 | 856 | 851 | 860 | 935 | 861 |
| Devitrifying tendency | Good | Good | Good | Good | Good | Good | Good | Good |
| Refractive index | 1.633 | 1.638 | 1.630 | 1.636 | 1.638 | 1.641 | 1.649 | 1.637 |
| Coefficient of linear expansion ($\times 10^7$) | 93 | 95 | 96 | 95 | 96 | 98 | 100 | 93 |

|  | Example | | | | Comparative Example | | | |
|---|---|---|---|---|---|---|---|---|
| Composition | 17 | 18 | 19 | 20 | 1 | 2 | 3 | 4 |
| SiO$_2$ | 36 | 37 | 33 | 38 | 32 | 24 | 30 | 26 |
| B$_2$O$_3$ | 12 | 9 | 13 | 10 | 8 | 8 | 18* | 10 |
| Li$_2$O$_3$ | — | — | — | 2 | 10* | — | — | — |
| Na$_2$O | 7 | 3 | 6 | 7 | 2* | 9 | 7 | 15 |
| K$_2$O | — | 9 | 2 | 3 | — | — | — | — |
| Rb$_2$O | 5 | — | — | — | — | — | — | — |
| Cs$_2$O | — | — | — | — | — | — | — | — |
| MgO | — | 2 | — | — | — | — | — | — |
| CaO | — | — | — | — | 2 | — | — | — |
| SrO | — | — | — | — | — | — | — | — |
| ZrO$_2$ | 10 | 8 | 9 | 8 | 10 | 22* | 8 | 4* |
| BaO | 30 | 30 | 32 | 32 | 33 | 35 | 32 | 40 |
| ZnO | — | — | — | — | — | — | — | — |
| TiO$_2$ | — | — | — | — | — | — | — | — |
| GeO$_2$ | — | — | — | — | — | — | — | 5 |
| La$_2$O$_3$ | — | — | — | — | — | — | 5 | — |
| Al$_2$O$_3$ | — | 2 | 5 | — | 3 | 2 | — | — |
| Properties of glass | | | | | | | | |
| Water resistance (hr) | 200 | 190 | 210 | 180 | — | — | 80 | 30 |
| Temperature at which the viscosity is 10$^{3.5}$ poises (°C.) | 900 | 892 | 899 | 884 | — | — | 824 | 882 |
| Devitrifying tendency | Good | Good | Good | Good | Poor | Poor | Slightly poor | Good |
| Refractive index | 1.622 | 1.610 | 1.618 | 1.614 | — | — | 1.605 | 1.617 |
| Coefficient of linear expansion ($\times 10^7$) | 94 | 94 | 95 | 93 | — | — | 95 | 102 |

The multicomponent glasses in Comparative Examples 1 and 2 have a great devitrifying tendency. The multicomponent glass in Comparative Example 3 shows a great divitrifying tendency and has poor water resistance. The multicomponent glass of Comparative Example 4 has poor water resistance.

In contrast, the multicomponent glasses of Examples 1 to 20 have an excellent water resistance of 160 to 250 hours, a reduced devitrifying tendency and a high refractive index of 1.610 to 1.654 in a well-balanced combination.

EXAMPLES 21 TO 24

Table 2 shows the properties of light-transmitting bodies produced by using the multicomponent glasses of Examples 6, 1, 16 and 3 respectively (Examples 21, 22, 23 and 24) as a core component, and the compositions of covering glass components used.

These light-transmitting bodies were produced by using a platinum double crucible. The core glass had a diameter of 100 nm, and the outside diameter of the resulting light-transmitting body was 150 nm.

TABLE 2

| | Example | | | | | | | |
|---|---|---|---|---|---|---|---|---|
| | 21 | | 22 | | 23 | | 24 | |
| Composition | Core glass | Covering glass | Core glass | Covering glass | Core glass | Covering glass | Core glass | Covering glass |
| SiO$_2$ | 38 | 55 | 34 | 45 | 30 | 58 | 27 | 42 |
| B$_2$O$_3$ | 6 | 13 | 8 | 17 | 14 | 10 | 10 | 15 |
| Li$_2$O | — | 2 | 7 | — | — | — | — | — |
| Na$_2$O | 12 | 14 | 4 | 15 | 4 | 20 | 9 | 12 |
| K$_2$O | — | 4 | — | — | — | 2 | — | 3 |
| Rb$_2$O | — | — | — | — | — | — | — | — |
| Cs$_2$O | — | — | — | — | 4 | — | — | — |
| MgO | 4 | 2 | — | — | 2 | — | — | — |
| CaO | — | — | — | — | 5 | — | — | — |
| SrO | — | — | — | — | — | — | — | — |
| ZrO$_2$ | 8 | — | 8 | — | 8 | — | 17 | — |
| BaO | 32 | — | 33 | — | 30 | — | 32 | — |

TABLE 2-continued

|  | Example | | | | | | | |
|---|---|---|---|---|---|---|---|---|
|  | 21 | | 22 | | 23 | | 24 | |
| Composition | Core glass | Covering glass | Core glass | Covering glass | Core glass | Covering glass | Core glass | Covering glass |
| ZnO | — | 7 | — | 8 | — | 5 | — | 8 |
| $TiO_2$ | — | — | — | — | — | — | — | — |
| $GeO_2$ | — | — | 5 | — | — | — | 5 | — |
| $La_2O_3$ | — | — | — | — | 2 | — | — | — |
| $Al_2O_3$ | — | 3 | 1 | 15 | 1 | 5 | — | 20 |
| Properties |  |  |  |  |  |  |  |  |
| Coefficient of linear expansion ($\times 10^7$) | 105 | 95 | 93 | 87 | 93 | 92 | 98 | 85 |
| Temperature at which the viscosity is $10^{3.5}$ poises (°C.) | 918 | 976 | 881 | 1010 | 861 | 982 | 964 | 1045 |
| Devitrifying tendency | Good | Good | Good | Good | Good | Good | Good | Good |
| Transmission loss (830 nm) | 9.2dB/km | | 10.5dB/km | | 12.3dB/km | | 14.6dB/km | |
| Transmission loss (630 nm) | 16.4dB/km | | 18.0dB/lm | | 18.7dB/km | | 22.8dB/km | |
| Numerical Aperture | 0.56 | | 0.57 | | 0.61 | | 0.66 | |

What we claim is:

1. A step-type light-transmitting body having excellent water resistance, said light-transmitting body comprising a core material of a glass having a refractive index of 1.60 to 1.66 and the following composition in % by weight:

| (1) $SiO_2$ | 15–40, |
|---|---|
| (2) $ZrO_2$ | 8–15, |
| (3) $B_2O_3$ | 7–12, |
| (4) BaO | 30–45, |
| (5) $Na_2O$ | 5–12, |
| (6) $GeO_2$ | 0–30, |
| $TiO_2$ | 0–3, |
| $Al_2O_3$ | 0–5, |
| $La_2O_3$ | 0–5, |
| MgO | 0–5, |
| CaO | 0–7, |
| ZnO | 0–7, |
| SrO | 0–5, |
| $Li_2O$ | 0–8, |
| $K_2O$ | 0–10, |
| $Rb_2O$ | 0–5, and |
| $Cs_2O$ | 0–8; |
| provided that |  |
| $SiO_2 + GeO_2$ | 15–50, |
| $ZrO_2 + BaO$ | 38–50, |
| $Na_2O + Li_2O + K_2O + Rb_2O + Cs_2O$ | 5–15, and |
| $MgO + CaO + ZnO + SrO + TiO_2 + Al_2O_3 + La_2O_3$ | 0–12. |

* * * * *